Nov. 7, 1933.                R. STRESAU                1,933,772
                      THICK WALLED PRESSURE VESSEL
                        Filed April 19, 1929

INVENTOR.
RICHARD STRESAU
BY
ATTORNEY.

Patented Nov. 7, 1933

1,933,772

UNITED STATES PATENT OFFICE 1,933,772

THICK WALLED PRESSURE VESSEL

Richard Stresau, Wauwatosa, Wis., assignor to A. O. Smith Corporation, Milwaukee, Wis., a corporation of New York Application April 19, 1929. Serial No. 356,431

3 Claims. (Cl. 219—10)

This invention relates to reenforcing of thick walled pressure vessels.

The object of the invention is to provide a method of reenforcing the wall of a vessel adjacent the manway and other openings therein. Other objects will appear from the description of the invention as set forth hereinafter.

Figure 1:
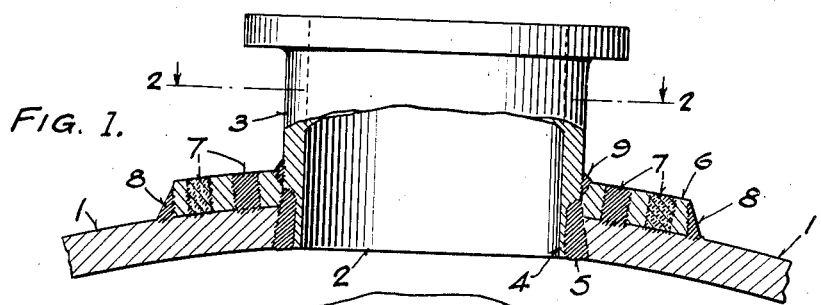
Figure 1 is a longitudinal section through a manway and an adjacent portion of the vessel showing the reenforcements.

The thick metal wall 1 of the vessel has a circular opening 2 cut therethrough for receiving a manway or tubular connection 3. The edges of the opening are preferably cut to converge slightly towards the outside of the vessel. The tubular connection 3 has its inner end chamfered to provide a welding groove between the same and the edges of the opening. The chamfering of the tubular connection provides a thin flexible lip 4 at the inner circumference of the connection which forms one side wall of the welding groove.

The connection is preferably electric arc welded to the vessel wall.

When the welding metal 5, which is deposited in the groove, cools and tends to contract, the flexible lip 4 flexes outwardly thus substantially relieving the tension-stresses which would otherwise have been set up in the weld.

The method of welding the tubular connection to the vessel wall is more fully described and claimed in Patent No. 1,787,580, issued January 6, 1931, to Thomas McLean Jasper, and assigned to the A. O. Smith Corporation.

Encircling the tubular connection 3 is a reenforcing plate 6 which conforms to the shape of the vessel wall and which is welded thereto. The reenforcing plate has a plurality of holes 7 therethrough which are preferably arranged in staggered relation in two concentric circles. Welding metal is deposited in said holes by an electric arc to fuse the plate at the bottom of the holes with the metal of the vessel wall. The welding metal 5 also extends to fuse with the reenforcing plate at the inner corner thereof, as shown in the drawing.

The plate is further welded to the vessel wall by a deposition of welding metal 8 at the outer circumference thereof. The metal 8 preferably has a triangular section and extends along the vessel wall a distance approximately one-third of the thickness of the reenforcing plate.

The reenforcing plate is further welded to the tubular connection 3 at the outer corner 9 therebetween.

The reenforcing plate thus welded to the vessel and to the tubular connection greatly strengthens the vessel wall and the joint between the same and the tubular connection.

Figure 2:
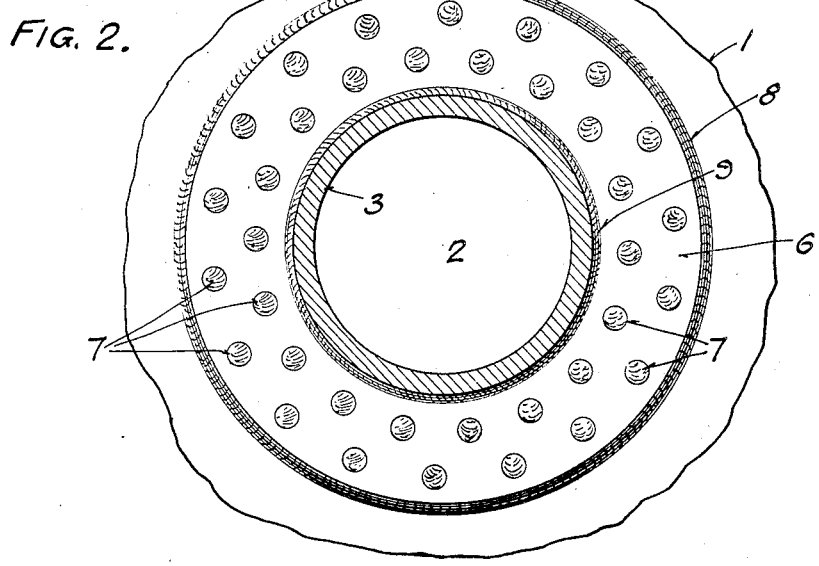
Fig. 2 is a section on the line 2—2 of Fig. 1.
Figure 3:
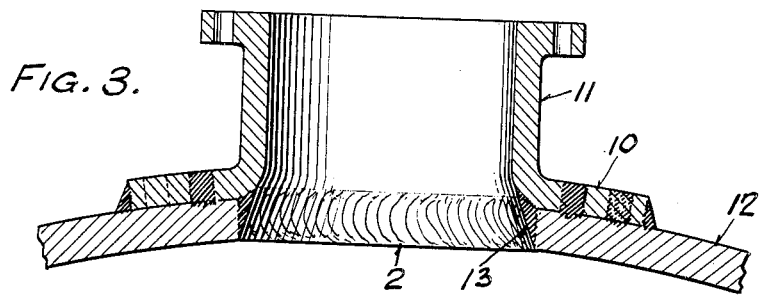
Fig. 3 is a longitudinal section showing a modified embodiment of the invention.
Figure 4:
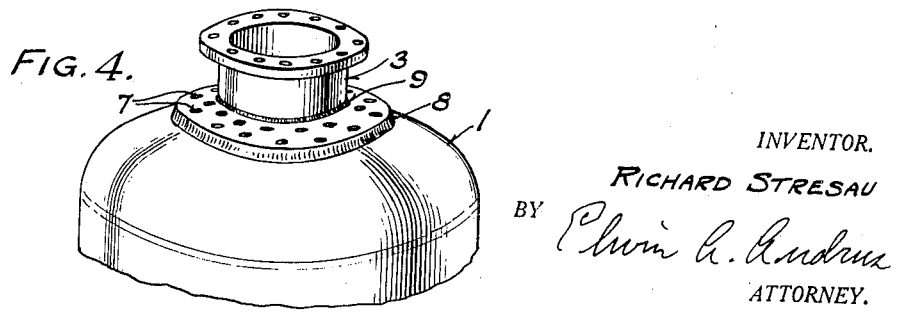
Fig. 4 is a perspective view of a manway and a vessel head.

In Fig. 3, the reenforcing plate 10 is an integral flange on the tubular connection 11. The reenforcing plate is welded to the vessel wall 12 in the same manner as the plate, shown in Figs. 1 and 2. The tubular connection 11 is further welded to the vessel wall at 13 to seal the joint therebetween.

The invention may have various embodiments within the scope of the claims.

I claim:

1. A pressure vessel comprising a wall having an opening, a tubular manway connected to the wall defining the opening, and an annular reenforcing ring disposed to encircle the manway, said ring being connected at its inner margin to the manway by a weld which extends from the upper inner edge of the ring and a weld which extends from the lower margin of the wall, said welds meeting intermediate the edges of the ring to provide a substantially continuous weld which units the manway with the margins of the wall and ring, the ring being connected to the wall by welds along the outer periphery of the ring and at regions intermediate the outer periphery and the manway.

2. A pressure vessel comprising a wall having an opening, an annular reenforcing ring disposed on the wall providing a thickened portion of wall around the opening, a tubular manway extending into the opening and having a thinned portion at the end, an inner weld joining said thinned portion with the marginal metal of the wall and the lower marginal metal of the ring, a weld joining the upper marginal metal of the ring with the tubular member, said welds meeting intermediate the upper and lower edges of the ring and providing a substantially continuous weld, said ring being united with the wall by a weld along its outer edge and at regions intermediate the outer edge and the manway.

3. The method of reenforcing thick walled pressure vessels having a tubular connection which comprises reenforcing by applying a plate to encircle the connection, chamfering the upper inner edge of the plate to provide a depository for weld metal having a depth less than the thickness of the plate, chamfering the lower outer wall of the tubular connection to provide a depository for weld metal which extends across the edge of the vessel wall and the lower inner edge of the plate, fusing metal in said depositories to fill the same and unite the tubular connection by fusion with the vessel and plate along their entire inner edges thereby to provide a meeting of the fused metal at the inner ends of said depositories, and welding the plate to the vessel wall through a plurality of holes in the plate and along the outer edge of the plate.

RICHARD STRESAU.